Figure 1:
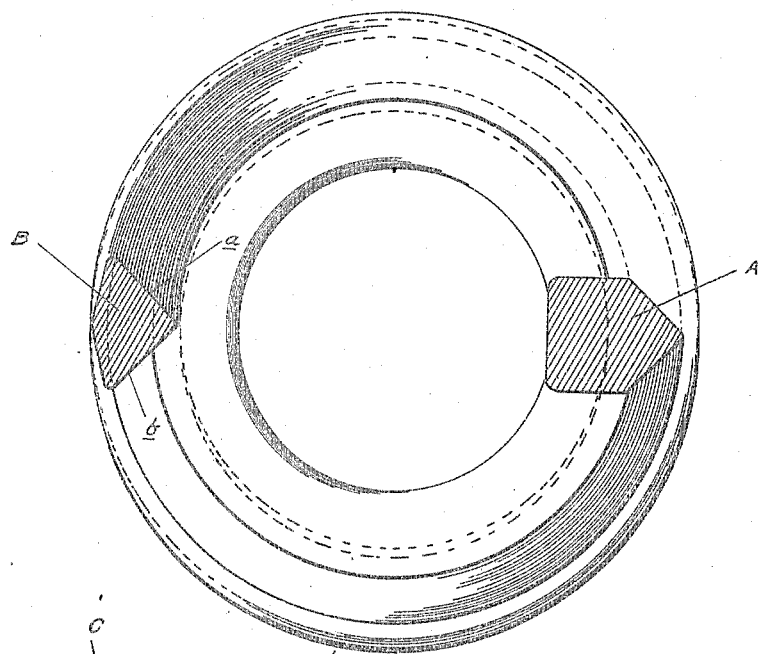

No. 817,482. PATENTED APR. 10, 1906
G. L. HARVEY.
SPRING.
APPLICATION FILED JULY 10, 1905.

WITNESSES

INVENTOR
GEORGE LYON HARVEY
BY
ATT'Y

UNITED STATES PATENT OFFICE.

GEORGE LYON HARVEY, OF CHICAGO, ILLINOIS.

SPRING.

No. 817,482.  Specification of Letters Patent.  Patented April 10, 1906.

Application filed July 10, 1905. Serial No. 269,085.

*To all whom it may concern:*

Be it known that I, GEORGE LYON HARVEY, a citizen of the United States, residing at Chicago, in the county of Cook and State of Illinois, have invented certain new and useful Improvements in Springs, of which the following is a specification, reference being had therein to the accompanying drawings.

The invention relates to improvements in springs; and it consists particularly in the construction and application of a stop to limit or prevent creeping of one spring in relation to the other when two coil-springs are coiled one upon the other or intercoiled.

In the drawings I have shown a construction in which but two springs are employed, each a spiral throughout; but it is obvious that one of the members may be made up of separate coils, if desired.

In the manufacture of such springs, particularly for use in connection with the draw-gear of railway-cars, it has been found that one spring creeps or moves endwise on the other, and considerable time and expense have been spent to devise a means for overcoming this creeping.

My device embodies a stop applied to the end of one spring member, against which the end of the other abuts, which is a construction easily manufactured and which does not reduce the strength of either spring at any point and which also does not prevent the assembling of the springs and yet produces a stop that is of sufficient strength to prevent its sheering under the heavy strains to which such springs are subjected.

Figure 2:
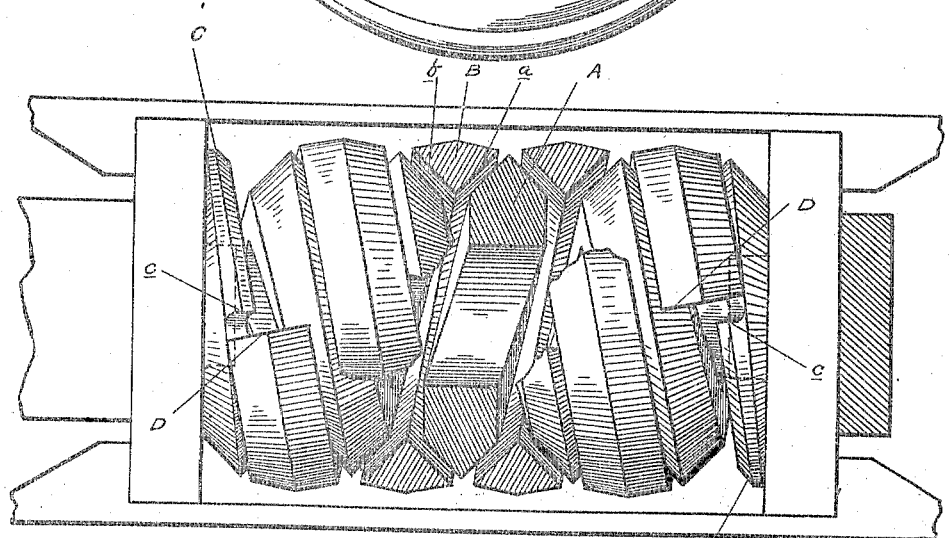
Figure 3:
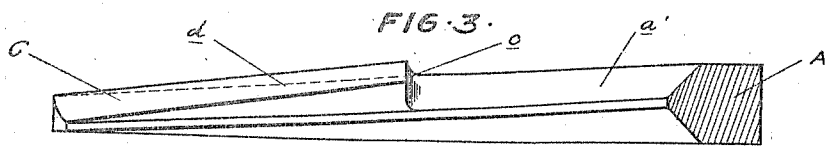

In the drawings, Figure 1 is a plan view of my improved spring with the two members shown in section. Fig. 2 is a side elevation thereof, partly broken away and in section to more clearly illustrate the construction; and Fig. 3 is an elevation of the ends of the inner spring, showing the extension and the stop applied thereto.

In the drawings I have shown the inner coiled spring A and the outer coiled spring B having the complementary inclined meeting faces $a$ and $b$. The outer spring is preferably elliptical, while the inner spring is circular. This construction is substantially like that shown in my Patent No. 758,067 of April 26, 1904. The inner spring in this case I have shown as longer than the outer spring and as provided with the extensions C projecting beyond the ends D of the outer spring. These extensions are provided on one of the inclined faces $a$ with the integral shoulder or abutment $c$, which preferably has the inclined face $d$ extending from the highest point of the shoulder toward the end of the spring. The outer spring is slightly shorter than the inner spring between the points of abutment or shoulder $c$, so that there will be no tendency when the spring is compressed to spread the outer coils because of the engagement of the ends thereof with both the shoulders or abutments, and also, preferably, to allow a slight creeping action. By making the incline $d$ in coiling the two together the outer spring is more readily engaged upon the inner spring, as it acts somewhat as a wedge in that operation; but as soon as the end of the outer spring has passed the shoulder the resiliency of the inner spring will cause it to assume its normal position. The operation of such a friction-spring is fully described in my previous patent, and I do not deem it necessary to here set it forth. It is obvious that with such integral stops or shoulders the outer spring can creep but very little, if at all, in relation to the inner spring, and therefore it will be held in proper position to perform its function.

By making the shoulder or stop upon one of the inclined faces it does not interfere with the proper action of all the coils, including the end coil of the inner spring.

What I claim is—

1. The combination of an inner and an outer coiled spring, of means for preventing the creeping comprising an integral shoulder on one spring against which the end of the other spring abuts.

2. The combination of inner and outer coiled springs, one spring having its ends projecting beyond the ends of the other, and stops formed on the extensions of the longer spring against which the ends of the shorter spring will strike to limit creeping.

3. The combination of inner and outer coiled springs, of stops on one spring against which portions of the other spring are adapted to abut, to limit creeping, such stops being so placed as to allow a limited movement of one spring on the other.

4. The combination of inner and outer coiled springs, one spring having its ends projecting beyond the ends of the other, stops formed on the extensions of the longer spring, and against which the ends of the shorter spring are adapted to abut, to limit creeping, such stops being a slightly-greater distance apart than the length of the shorter spring.

5. The combination of inner and outer coiled springs, having complementary inclined contacting surfaces, one spring having extensions beyond the end of the other, and lugs on the inclined faces of such extensions against which the ends of the shorter spring are adapted to abut.

6. The combination of inner and outer coiled springs, having complementary inclined contacting surfaces, the inner spring having shouldered tapering extensions beyond the ends of the outer spring, the ends of the outer spring adapted to abut against the shoulders on the extensions to limit creeping.

7. The combination of inner and outer coiled springs having complementary inclined contacting surfaces, the inner spring having extensions beyond the ends of the outer spring, the shoulders $c$ formed on one of the inclined surfaces of the extensions, and the inclined face $d$ extending from said shoulder toward the end of the extension, substantially as and for the purpose set forth.

8. In a friction device, inner and outer coiled resilient members and means on said members for limiting the creeping thereof in relation to each other, substantially as described.

In testimony whereof I affix my signature in presence of two witnesses.

GEORGE LYON HARVEY.

Witnesses:
WILLIAM CLARKE ANDERSON,
HERBERT B. KNUDSEN.